March 22, 1932. R. R. BOTTOMS 1,850,529
PROCESS FOR EXTRACTING HELIUM
Filed July 30, 1929
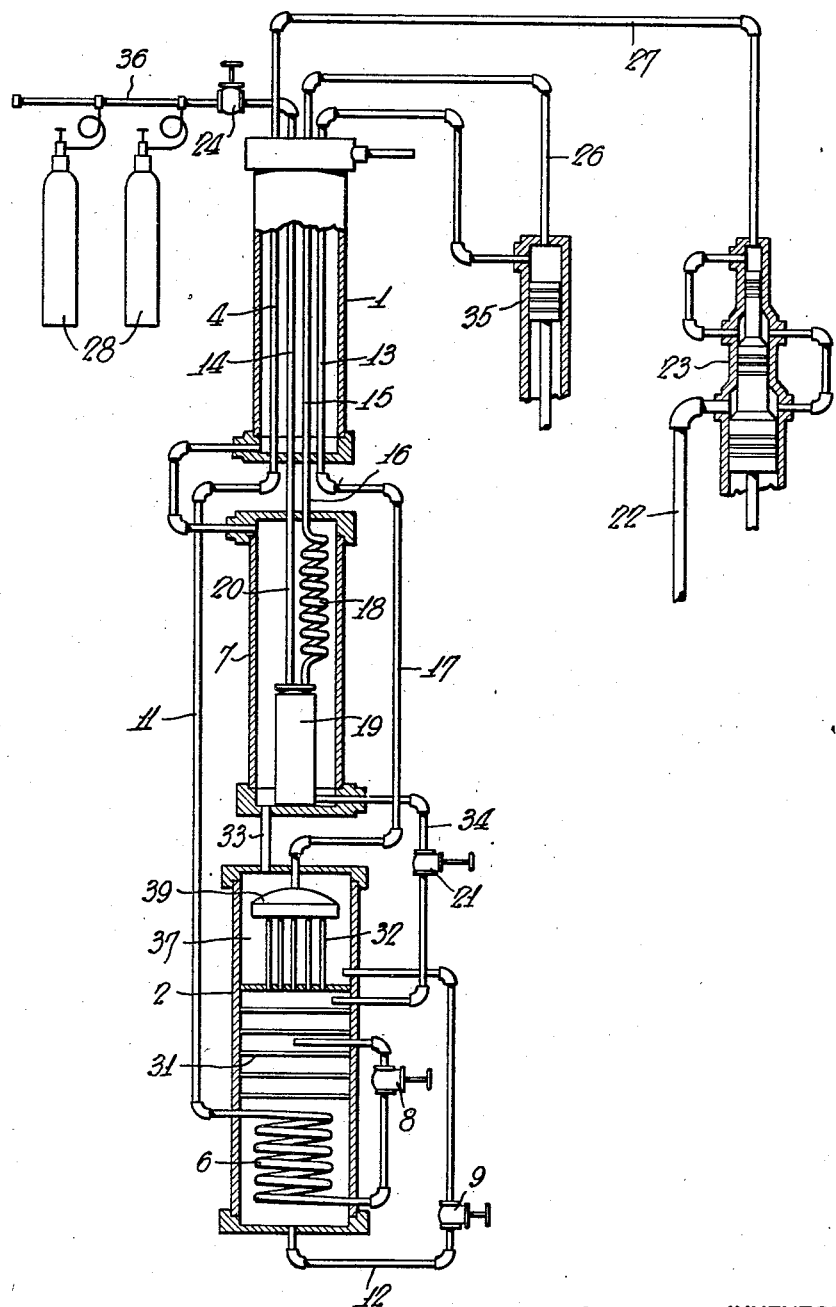
Robert Roger Bottoms INVENTOR
BY
Dean Fairbank Albright & Hersh
his ATTORNEYS Patented Mar. 22, 1932

1,850,529

UNITED STATES PATENT OFFICE

ROBERT ROGER BOTTOMS, OF LOUISVILLE, KENTUCKY, ASSIGNOR TO THE HELIUM COMPANY, OF LOUISVILLE, KENTUCKY, A CORPORATION OF KENTUCKY

PROCESS FOR EXTRACTING HELIUM

Application filed July 30, 1929. Serial No. 382,221.

This invention relates particularly to the extraction of helium from natural gas and is particularly designed for use where the percentage of helium in the natural gas is comparatively low.

The apparatus may be employed for the separation of other gases particularly where the gas to be separated has a very much lower liquefying point than the other gases with which it is associated and where said gas is present in relatively small quantities.

The invention involves certain improvements on the invention disclosed and claimed in my prior application Serial No. 309,009, filed Sept. 28, 1928.

In my present invention I employ a fractionating column and utilize the base portion of this column as the preliminary condenser and cool both the upper part of the fractionating column and the lower part of the secondary condenser by liquid collecting in the base of the fractionating column.

The invention involves various novel and important features which will be more particularly pointed out in connection with a preferred form of my improved apparatus shown in the accompanying drawing. In the drawing the single figure is a vertical sectional view, many of the parts being somewhat conventionally illustrated.

In the construction illustrated the raw gas to be treated is delivered though a pipe 22 to a multiple stage compressor 23 where it is compressed to a pressure of 40 to 200 atm. The gas to be treated is ordinarily natural gas containing a small percentage of helium. The other gases may include nitrogen and other such gases usually associated with helium and which have a very much higher liquefying point. Before the gas is delivered to the pipe 22 it is treated to remove as far as possible the more readily condensable ingredients such as water vapor, carbon dioxide and the like. The gas is delivered from the compressor through a pipe 27 to a heat interchanger 1 and passes through the pipe 4 in the latter. This heat interchanger is merely conventionally illustrated and it will be understood that it is to be properly insulated and the passages through it are to be of such length and so intimately associated as to effect the proper interchange of temperature of the gases flowing in opposite directions through the separate passages. The cold gas delivered by the pipe 4 passes through a pipe 11 to a coil 6 in the base of a fractionating tower 2 which does not in itself involve any specifically new features and which may be of a form heretofore employed in connection with the liquefaction of air and the separation of it into oxygen and nitrogen.

The natural gas containing the small percentage of helium is completely liquefied in the coil 6, the helium being in solution in the liquid which is formed from the other and major constituents of the natural gas. From the coil 6 the liquid passes through an expansion valve 8 and is delivered to a point intermediate of the height of the fractionating column and about midway of the baffle plates or other obstructions 31. These may be of any desired construction and serve to effect an intimate contact of the descending liquid and the ascending gases or vapors. A portion of the liquid delivered to the column past the expansion valve 8 will pass upwardly as a vapor or gas through the plates 31, while another portion will flow to the bottom of the column and surround the coil 6. As the gas pressure within the column is lower than it is within the coil 6 the liquid around the coil will be partially boiled off and the liquid within the coil will be liquefied. Substantially all of the helium will pass upwardly and practically none of it will remain in solution in the liquid in the bottom of the column.

The helium free liquid is delivered from the base of the column through a pipe 12 and expansion valve 9 to a compartment 37 in the upper part of the column. Pipes 32 extend upwardly through this compartment and unite in a dome 39 having a delivery pipe 17. As the vapors or gases within the pipes 32 are under a higher pressure than that existing in the compartment 37 some of the liquid in the compartment will be boiled off and a corresponding amount of the vapors and gases within the pipes 32 will be liquefied and flow downwardly through the baffle plates 31.

The pressure in the interior of the column will ordinarily be from 3 to 20 atm. and therefore most of the vapors with the exception of the helium will be liquefied in the tubes 32. The liquid in the compartment 37 around such tubes will ordinarily be only slightly above atmospheric pressure.

Above the fractionating column there is provided a condenser 7 which communicates with the compartment 37 by a pipe 33. Vapors produced by the evaporation of liquid in the compartment 37 will pass upwardly through the pipe 33 and at the same time surplus liquid will also pass upwardly through this pipe so that there will be liquid in the condenser 7.

The gas delivered through the pipe 17 from the fractionating column includes all of the helium, but also includes other gases which were not liquefied in the tubes 32. This mixture I designate as the crude helium, that is, it is not the pure gas, but is far richer in helium than the natural gas delivered to the apparatus. This crude helium flows from the pipe 17 through the pipe 13 of the heat interchanger 1 to a high pressure compressor 35 where the pressure is increased to about 2000 pounds. The heat of compression is removed from this compressed crude helium by a suitable cooler as is usual in all apparatus of this general type and which has not been illustrated.

The gas delivered from the compressor through the pipe 26 and which pipe may include such a cooler, is delivered to the pipe 15 of the heat interchanger 1 and thence through a pipe 16 to a coil 18 in the condenser 7. Practically all of the non-helium constituents of the crude helium will be liquefied or condensed to the liquid phase and will be separated from the pure helium in a collecting pot or chamber 19 in the lower portion of the condenser 7. Due to the fact that the helium is present to a comparatively large percentage in this crude helium it will not dissolve to any considerable extent in the liquefied constituents and may be withdrawn from the pot 19 through a pipe 20 leading to a pipe 14 in the main heat interchanger. From the discharge end of this pipe 14 the gas may be delivered past a valve 24 to a manifold 36 from which it may be delivered to storage receptacles 28 under pressure of the compressor 35 which as above noted will ordinarily be in the neighborhood of 2000 pounds.

The liquid which collects in the pot 19 of the condenser is drawn off through a pipe 34 and valve 21 and delivered to the upper portion of the fractionating column directly above the inlet from the coil 6 and below the condenser tubes 32. The valve 21 permits the reduction of pressure of this liquid, which does contain some helium in solution, to the pressure of the fractionating column which as above noted will ordinarily be from 3 to 20 atm.

The liquid collecting in the chamber 38 at the bottom of the rectifying column is substantially free from helium. This liquid leaves the apparatus through the pipe 12, valve 9, chamber 37, pipe 33, condenser 7, pipe 10, heat interchanger 1 and outlet pipe 30.

As previously noted the apparatus may be modified in various details without departing from the spirit of my invention. I have illustrated the rectifying column, the crude helium condenser and the heat interchanger as three separate pieces of apparatus. It will, of course, be obvious that in commercial practice these may be combined in the same housing and insulation and form a single unit. The pipe 10, the top of the condenser 7 and the bottom of the heat interchanger 1 may be omitted, the casing of the condenser and the casing of the heat interchanger being directly connected. Also the pipe 33, the top of the rectifying column and the bottom of the condenser 7 may be omitted, the casing of the condenser and the casing of the rectifying column being directly connected so that the pot 19 and the tubes 32 will be in the same chamber and therefore in superposed or any other desired relative positions.

In my improved process a preliminary separation is effected in the fractionating column whereby substantially all of the helium is obtained in a crude form. This crude helium is compressed and recooled under conditions which do not result in the liquefaction of the helium to any considerable extent, but does result in the liquefaction and substantially complete separation of the more liquefiable constituents of the crude helium. All of the liquid which is formed from the crude helium and which does contain some helium in solution is delivered to the fractionating column so that this helium will be recycled as a part of the crude helium, while the major portion of the non-helium constituents are collected and removed from the system.

By means of my improved process I am able to treat natural gas containing one percent or even less of helium and obtain a substantially pure product and at the same time obtain substantially all of the helium in the original gas.

Having thus described my invention, what I claim as new and desire to secure by Letters Patent is:

1. The method of separating helium from a gaseous mixture, including liquefying the mixture to form a liquid containing the helium in solution, effecting a separation of said liquid into crude helium gas and a substantially helium-free liquid, recompressing the crude helium, and effecting by rectification a separation of the recompressed crude helium into substantially pure helium gas and a liquid containing helium, both said first mentioned liquefaction and said second mentioned separation being effected by the evaporation of said substantially helium-free liquid under lower pressure.

2. The method of separating helium from a gaseous mixture, including compressing the mixture to high pressure, liquefying the mixture in the base of a rectifying column, delivering the liquid to the column at a point intermediate of the height of the latter thereby separating crude helium in gaseous form from the residual substantially helium-free liquid, recompressing said crude helium to a pressure suitable for commercial shipment of helium in cylinders, liquefying the impurities of said crude helium at said last mentioned pressure thereby separating pure helium under pressure, and delivering said liquefied impurities to said rectifying column for rectification with said first mentioned liquid.

3. The method of separating substantially pure helium from natural gas, which includes compressing the gas, liquefying it in the base of a rectifying column, expanding the liquid into the column, cooling the vapors at the top of the column by liquid withdrawn from the bottom of the column and thereby producing a crude helium gas, recompressing the crude helium to a pressure of approximately 2000 pounds, and cooling said compressed crude helium to liquefy substantially all of the non-helium constituents by the evaporation of liquid withdrawn from the bottom of said rectifying column.

4. The method of separating substantially pure helium from a gaseous mixture, including compressing the mixture to a high pressure, cooling the compressed mixture to effect at least partial liquefaction, delivering the mixture at a lower pressure to a rectifying column to effect separation of a substantially helium free liquid and a crude helium gas, cooling the crude helium gas to effect liquefaction of some of the impurities thereof, returning said impurities to the rectification column, withdrawing the residual gas, recompressing to a high pressure, cooling to effect liquefaction of substantially all of the non-helium constituents of said residual gas and leaving substantially pure helium, withdrawing said substantially pure helium, delivering said last mentioned liquid to the top of the rectification column, withdrawing liquid from the bottom of said column, lowering the pressure thereof, and evaporating it to effect said last mentioned cooling and said second mentioned cooling.

5. The method of separating helium from a gaseous mixture, including compressing the mixture, liquefying said mixture, releasing the liquid to lower pressure, rectifying at said lower pressure to separate crude helium gas and a liquid substantially free of helium, recompressing the crude helium gas, liquefying said recompressed gas by the evaporation of said substantially helium free liquid, separating substantially pure helium from said liquefied crude helium, reducing the pressure on said residual liquid, and rectifying the same in contact with the liquefied mixture in the first rectification.

Signed at Louisville, in the county of Jefferson and State of Kentucky, this 24th day of July, A. D. 1929.

ROBERT ROGER BOTTOMS.